UNITED STATES PATENT OFFICE.

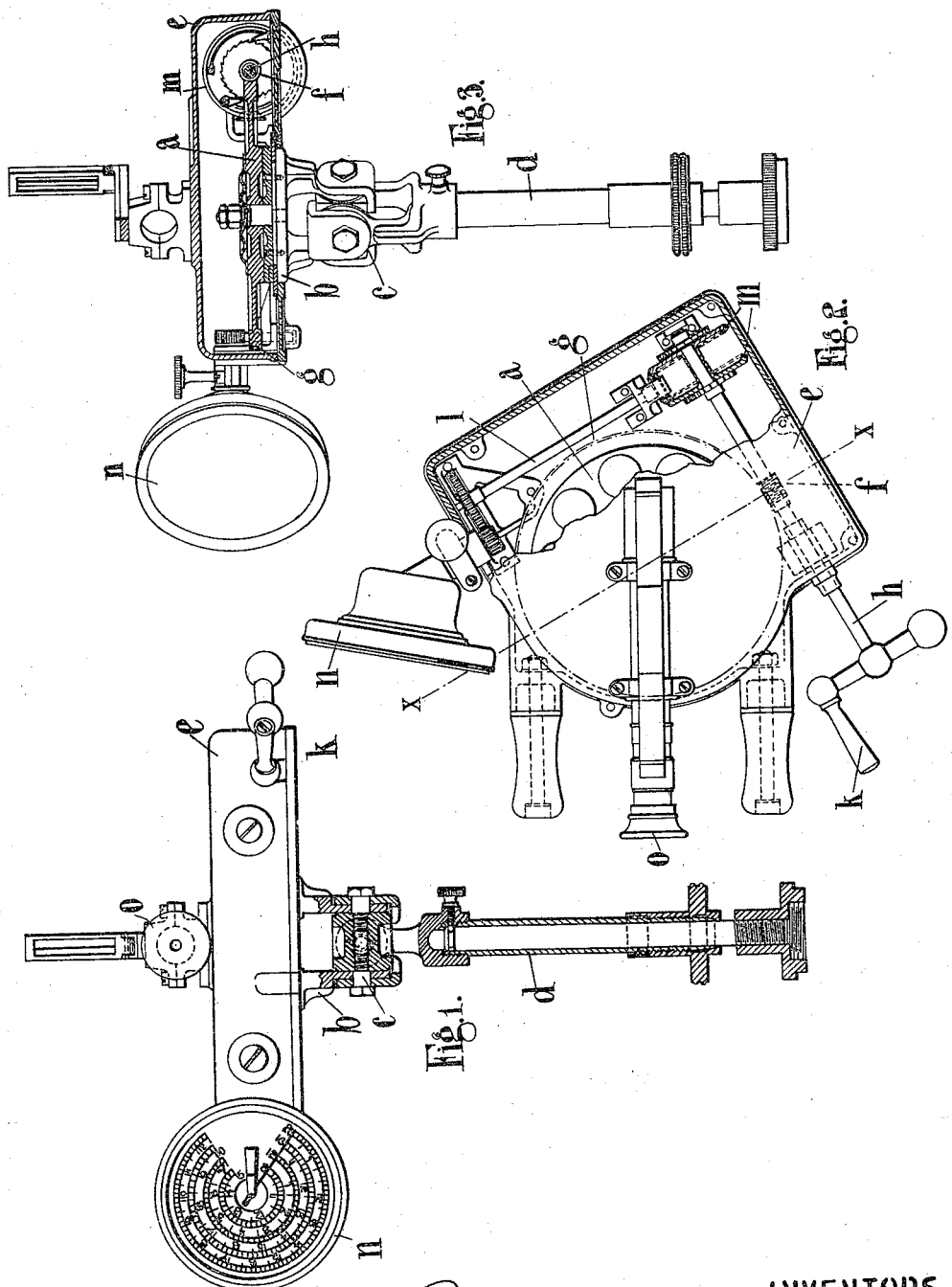

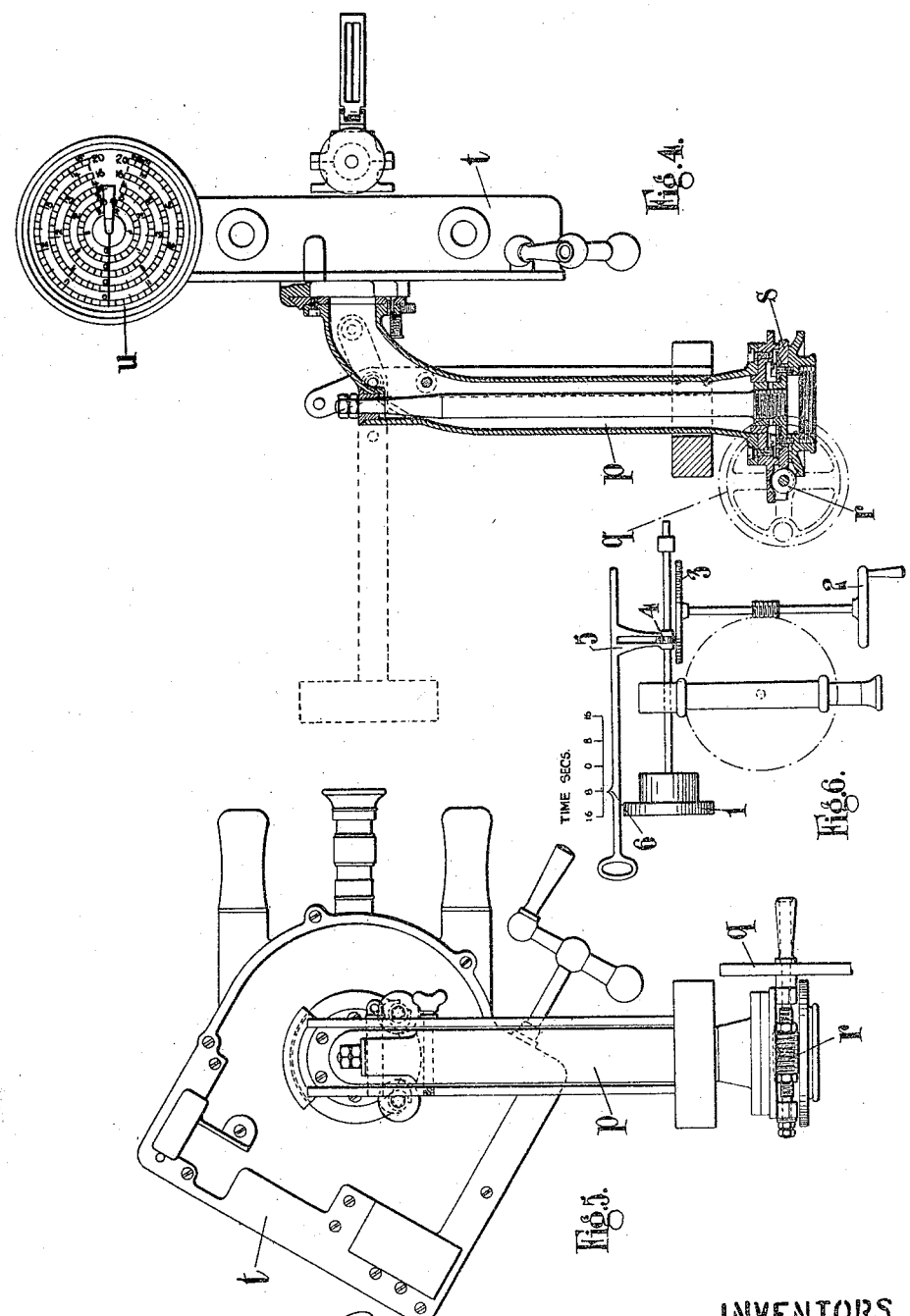

JOHN SIGISMUND WILSON AND WILLIAM ERNEST DALBY, OF LONDON, ENGLAND, ASSIGNORS OF ONE-THIRD TO SIR W. G. ARMSTRONG-WHITWORTH AND COMPANY LIMITED, OF NEWCASTLE-UPON-TYNE, ENGLAND.

SIGHTING APPARATUS FOR MEASURING ANGULAR VELOCITIES.

1,252,379.      Specification of Letters Patent.      Patented Jan. 1, 1918.

Application filed August 7, 1917. Serial No. 184,978.

*To all whom it may concern:*

Be it known that we, JOHN SIGISMUND WILSON, residing at 29 Denbigh street, London, S. W. 1, England, and WILLIAM ERNEST DALBY, residing at The City and Guilds Engineering College, Exhibition Road, London, S. W. 7, England, both subjects of the King of Great Britain and Ireland, have invented a certain new and useful Sighting Apparatus for Measuring Angular Velocities, of which the following is a specification.

The present invention relates to an improved apparatus for directing fire against aircraft.

The object of the present invention is to provide improved means of measuring the angular velocity in any plane of a distant object, relative to the instrument. It has a special application in connection with the directing of artillery fire on moving targets. It can be used with the known types of sight commonly fitted to guns, as the additional adjustments to allow for the motion of the moving target in both these directions can be rapidly made.

It has been proposed to provide sighting devices for ordnance in which the motion of the sight carrier or of the gun when laid on and following the angular motion of the object both vertically and horizontally is arranged to move pointers over dials suitably graduated to show the angular velocities of the object and (or) the proper lead angle for the gun.

Referring to the accompanying drawings:

Figure 1 is a front view partly in section.

Fig. 2 a plan, and

Fig. 3 a section on the line X—X, Fig. 2, of apparatus adapted for correcting the angle between the plane of sight and the axis of the gun.

Fig. 4 is a side view, and

Fig. 5 a back view of apparatus for determining the correction of tangent elevation.

Fig. 6 is a diagrammatic view showing apparatus by which the constant of the instrument can be varied, so that corrections to suit different times of flight can be read from the same scale.

In the form of the invention shown in Figs. 1, 2, and 3, a base plate $a$ is mounted frictionally on a bracket $b$, which is capable of turning about two axes at right angles, forming the universal joint $c$, capable of holding frictionally the base plate in any position to which it is turned. The standard $d$ carrying this universal joint is capable of movement about a vertical axis. A frame $e$ is arranged so that it can turn relatively to the base plate about an axis at right angles to the base plate, by means of the worm $f$ engaging with the worm wheel teeth $g$, carried by the base plate, the shaft $h$, and handle $k$, by which the rotation is effected, being carried by the frame $e$. The shaft $h$ is also arranged to actuate a spindle $l$ through ratchets and gear wheels $m$, so arranged that the rotation of the spindle $l$ is always in the same direction, whichever way the handle $k$ may be turned. The spindle $l$ actuates a speed indicator $n$, which may conveniently be any known magnetic or electro-magnetic type, through suitable gearing. If desired, additional change speed devices (not shown) may be interposed between the handle $k$ and the worm $f$ by which the frame $e$ is rotated, so that a convenient speed of rotation of the handle can be obtained for driving the speed indicator whatever may be the angular velocity of the line of sight. The frame $e$ carries a telescope $o$ or line of sights, of any convenient type. The speed indicator, so illustrated in Fig. 1, is provided with separate scales to suit different ranges or fuse times.

Figs. 4 and 5 show an instrument adapted for determining the correction in tangent elevation. The base plate in this case is mounted in a vertical plane on the end of a pillar $p$, which is rotated about a vertical axis by a hand wheel $q$, and worm $r$, engaging with a worm wheel $s$, which is frictionally held so that the instrument can be turned about the vertical axis by hand if desired. The mechanism within the frame $t$ is similar to that above described, with the exception that the mechanism for obtaining rotation of the speed indicator spindle in one direction only is omitted, the speed indicator $u$ in this case being arranged so that its zero reading is in the central position, the speed being measured in either direction clockwise or anti-clockwise on the dial.

The weight of the frame $t$ is conveniently balanced by a weight $w$ on an arm $y$ shown in dotted lines.

In the modification of the invention shown in Fig. 6, there is interposed between the speed indicator 1 and the handle 2 which drives it a friction disk 3 and roller 4, the ratio of drive of the speed indicator being determined by the position of this roller along the radius of the disk. The roller is carried by an arm 5, which carries a pointer 6, and is moved by a handle 7 in a lateral direction over a scale, as illustrated. This handle is set according to the range time or fuse time, and the necessity for different scales on the speed indicator is thus avoided.

In order to sight a gun using the instrument shown in Fig. 1, the instrument is first placed to measure the vertical angular velocity of the target. Let this observed angular velocity be $w$. The instrument is then placed to observe the angular velocity in the plane of altitude. Let $v$ be this observed angular velocity. Two instruments are preferably employed, so that these measurements may be made simultaneously. Let R be the range taken by the range-finder or other means, at the same time as the observations of the angular velocity are made, and let $t$ be the time of flight corresponding to this range, or other modified range for which the gun is set, or corresponding to the fuse time. Then the angle of elevation of the gun required must be increased or diminished by the amount $w\,t$, and the angle of lateral deviation from the plane of sight, measured in the plane of altitude, must be increased or diminished by the angle $v\,t$.

The scale of the dial may be graduated to read angles per second, or corresponding corrections to tangent elevation or lateral deflection in terms of fuse time or time of flight for any particular gun; or it may be graduated to suit any function of the angular velocity of the target relatively to the gun which may be found convenient in laying the gun.

The method of using the instrument is as follows:—

In order first to determine the correction necessary owing to the angular velocity of the target in the vertical plane, the base plate is first turned into the vertical position. The moving target is caught on the sights, and the observer turns the handle, or regulates the speed of the clockwork or other power to the speed necessary to keep the moving target on the sights. The speed indicator then shows the angular velocity of the frame relatively to the base plate, from which may be deduced, by calculation, or by direct observation of a scale on the dial, the angular correction of tangent elevation to be given to the gun sights. Similarly, in order to determine the correction necessary owing to the angular velocity of the target in the plane of altitude, the base plate is turned to a position parallel to the plane of altitude, the target is caught on the sights, and the mechanism regulated to the speed necessary to keep the target on the sights. The speed indicator then shows the angular velocity of the frame relatively to the base plate for motion in this direction. As the target moves along, the base plate may be slightly tilted about one or both of its pair of axes at right angles to keep it in the changing altitude plane, which is the plane in which the measurement is wanted.

It will be seen that although we have described the invention as applied to the separate measurement of the components of the angular velocity of the moving target, the plane in which the instrument is set may be the plane in which the target is moving, in which case a single measurement of angular velocity may be made, and the components in any required directions deduced if necessary.

It will be obvious that the invention is also applicable to cases in which the instrument is on a moving platform.

Having now described our invention, what we claim as new and desire to secure by Letters Patent is:—

1. Apparatus for determining the correction of the angle between the plane of sight and the axis of the gun comprising a base plate mounted so that it can be turned to lie approximately in the plane of altitude, a support for the base plate and a sighting device pivotally carried on said base plate and adapted to have its line of sight maintained upon a target; with means connected to the sighting device for measuring its angular velocity relative to the base plate.

2. In apparatus for directing artillery fire by measuring the rate of relative angular movement of the target in the plane of altitude, or in any other plane passing through the target, a frame, a base plate thereon, a support for the frame, a bracket on the support, a sighting device carried on the base plate rotatable relatively to the base plate and held frictionally to the bracket, gearing for giving a relative angular movement between said frame and said base plate and bracket and means for measuring the relative angular velocity of such movement.

3. Apparatus for determining the correction of tangent elevation or of the angle between the plane of sight and the axis of the gun, or both, comprising a base plate, a support for the base plate supporting it so that it can be turned about two axes at right angles, one of which is horizontal, and so that it can be turned about a vertical axis in combination with a frame arranged so as to be capable of turning about an axis at right angles to the base plate, a sighting device carried by said frame adapted to be alined on the target, means for rotating this frame relatively to the base plate and means co-acting with the rotating means for measuring the rate of angular movement.

4. In apparatus as claimed in claim 1, reducing gear to rotate the sighting device relatively to the base plate, a shaft to operate said gear, and a speed indicator operated by said shaft, substantially as described.

In testimony whereof, we have affixed our signatures.

JOHN SIGISMUND WILSON.
WILLIAM ERNEST DALBY.

Copies of this patent may be obtained for five cents each, by addressing the "Commissioner of Patents, Washington, D. C."